US010841968B2

(12) United States Patent
Li et al.

(10) Patent No.: US 10,841,968 B2
(45) Date of Patent: Nov. 17, 2020

(54) METHOD FOR PROCESSING ABNORMAL CORE NETWORK DISCONNECTION AND TERMINAL

(71) Applicant: Huawei Technologies Co., Ltd., Shenzhen (CN)

(72) Inventors: Zhongjin Li, Xi'an (CN); Wenjie Duan, Xi'an (CN); Zhichao Chen, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 20 days.

(21) Appl. No.: 16/318,548

(22) PCT Filed: Jul. 18, 2016

(86) PCT No.: PCT/CN2016/090267
§ 371 (c)(1),
(2) Date: Jan. 17, 2019

(87) PCT Pub. No.: WO2018/014152
PCT Pub. Date: Jan. 25, 2018

(65) Prior Publication Data
US 2019/0246443 A1 Aug. 8, 2019

(51) Int. Cl.
H04W 76/18 (2018.01)
H04L 29/06 (2006.01)
(Continued)

(52) U.S. Cl.
CPC ............ H04W 76/18 (2018.02); H04L 29/06 (2013.01); H04W 68/005 (2013.01);
(Continued)

(58) Field of Classification Search
CPC ...... H04W 76/18; H04W 76/19; H04W 76/11; H04W 76/30
See application file for complete search history.

(56) References Cited

U.S. PATENT DOCUMENTS 6,360,109 B1 * 3/2002 Thauvin .............. H04M 1/2749
455/564
2008/0309749 A1 * 12/2008 Feng ..................... H04M 1/247
348/14.01
(Continued)

FOREIGN PATENT DOCUMENTS

CN 101150858 A 3/2008
CN 102668687 A 9/2012
(Continued)

Primary Examiner — Jeffrey M Rutkowski
Assistant Examiner — Chae S Lee
(74) Attorney, Agent, or Firm — Slater Matsil, LLP

(57) ABSTRACT

Embodiments of the present invention provide a call prompt method. A first interface that shows that a first terminal is in a call with a second terminal is displayed on the first terminal. If a third terminal initiates a call to the first terminal at this moment, a second interface indicating the call initiated by the third terminal is displayed on the first terminal, and a sound is output, where the sound includes a call voice and a prompt tone of the initiated call. If the call initiated by the third terminal to the first terminal is rejected, the call voice is output on the first terminal and the prompt tone stops to be output. Additionally or alternatively, if the third terminal stops initiating the call, the first interface is displayed on the first terminal, and the call voice between the first terminal and the terminal continues to be output.

16 Claims, 3 Drawing Sheets

(51) Int. Cl.
*H04W 76/19* (2018.01)
*H04W 76/30* (2018.01)
*H04W 76/11* (2018.01)
*H04W 68/00* (2009.01)
*H04W 88/04* (2009.01)

(52) U.S. Cl.
CPC ............ *H04W 76/11* (2018.02); *H04W 76/19* (2018.02); *H04W 76/30* (2018.02); *H04W 88/04* (2013.01)

(56) References Cited

U.S. PATENT DOCUMENTS

| | | | |
|---|---|---|---|
| 2011/0019803 A1* | 1/2011 | Huang | H04N 7/147 379/32.01 |
| 2011/0149725 A1 | 6/2011 | Zhao et al. | |
| 2011/0199898 A1* | 8/2011 | Cho | H04W 48/06 370/230 |
| 2012/0039167 A1* | 2/2012 | Swaminathan | H04W 76/16 370/225 |
| 2015/0304603 A1* | 10/2015 | Yoon | H04W 76/19 348/14.07 |

FOREIGN PATENT DOCUMENTS

| | | | | |
|---|---|---|---|---|
| CN | 103685779 | * | 3/2014 | ............ H04L 12/24 |
| CN | 103685779 A | | 3/2014 | |
| CN | 104080065 A | | 10/2014 | |
| WO | 2015168494 A1 | | 11/2015 | |

* cited by examiner

METHOD FOR PROCESSING ABNORMAL CORE NETWORK DISCONNECTION AND TERMINAL

CROSS-REFERENCE TO RELATED APPLICATIONS

This application is a National Stage of International Application No. PCT/CN2016/090267, filed on Jul. 18, 2016, which is hereby incorporated by reference in its entirety.

TECHNICAL FIELD

The present invention relates to the communications field, and in particular, to a method for processing an abnormal core network disconnection and a terminal.

BACKGROUND

Based on analysis on big data of a mobile phone network, a calling failure rate 40.74% is caused by call connect disconnect (call connect disconnect) of a core network. A local mobile phone establishes a signaling connection to the core network, but the connection is disconnected by the network before a peer mobile phone is connected. This case is referred to as an abnormal core network disconnection.

In the prior art, after learning of the abnormal core network disconnection, the local mobile phone immediately reports the abnormal core network disconnection to a superstratum user interface (User Interface, UI). The UI destructs a call interface, and a user perceives that a call fails. This is a call failure.

It may be learned from the foregoing that, in the prior art, after the mobile phone learns of the abnormal core network disconnection, a call failure is immediately determined, and a calling connection rate is low.

SUMMARY

Embodiments of the present invention provide a method for processing an abnormal core network disconnection and a terminal, to effectively increase a calling connection rate.

According to one aspect, a method for processing an abnormal core network disconnection is provided. The method includes: when receiving a notification message indicating an abnormal core network disconnection, obtaining, by a terminal, a cause value of the abnormal core network disconnection from the notification message; and redialing, by the terminal, when determining that the cause value exists in a preconfigured first cause value list.

It may be learned from the foregoing that, in this embodiment of the present invention, when receiving the notification message indicating the abnormal core network disconnection, the terminal does not directly report the notification message to a UI, and a call failure is not determined. Instead, the terminal first obtains the cause value of the abnormal core network disconnection from the notification message, then inquires whether the cause value exists in the preconfigured first cause value list, and redials when determining that the cause value exists in the preconfigured first cause value list. A calling connection rate may be increased by redialing.

In a possible design, the redialing, by the terminal, when determining that the cause value exists in a preconfigured first cause value list includes: when determining that the cause value exists in the preconfigured first cause value list, redialing, by the terminal, once every redial interval within preset total redial duration.

It may be learned from the foregoing that, in this embodiment of the present invention, when it is determined that the cause value exists in the preconfigured first cause value list, redialing is performed once every redial interval within the preset total redial duration. A calling failure probability becomes increasingly low by redialing for a plurality of times, so that the calling connection rate can be further increased.

In a possible design, the redialing, by the terminal includes: obtaining, by the terminal from the notification message, a cell identity of a serving cell to which the terminal belongs; determining the cause value and a disconnection quantity of abnormal core network disconnection corresponding to the cell identity; and when the disconnection quantity is less than a first threshold quantity of times, redialing by using a cell corresponding to the cell identity as the serving cell; or when the disconnection quantity is greater than or equal to the first threshold quantity of times and is less than a second threshold quantity of times, determining that the cause value exists in a preconfigured second cause value list, and redialing by using a cell that is not a cell corresponding to the cell identity as the serving cell; or when the disconnection quantity is greater than or equal to the second threshold quantity of times, determining that the cause value exists in a preconfigured second cause value list, redialing once by using a cell that is not a cell corresponding to the cell identity as the serving cell after a redial interval, and setting a cell corresponding to the cell identity as an access stratum penalty cell within a penalty time.

It may be learned from the foregoing that, in this embodiment of the present invention, different measures are adopted based on the cause value and the disconnection quantity of abnormal core network disconnections corresponding to the cell identity, to increase the calling connection rate. When the disconnection quantity is relatively small, redialing is performed without replacing the serving cell; and when the disconnection quantity is relatively large, for a cause value that is of a disconnection and that satisfies a condition, the serving cell is replaced to continue a service. As the disconnection quantity of abnormal core network disconnections increases, penalty strength on a cell gradually increases. At a first stage, the cell is not penalized, and the cell can also be camped on if a camping condition is satisfied at a next moment. At a second stage, the cell is penalized, and the cell can be camped on only when the camping condition is satisfied and the penalty time expires. A situation in which calling cannot succeed by only redialing when the cell is abnormal can be effectively avoided in this manner, thereby further increasing the calling connection rate.

In a possible design, the setting a cell corresponding to the cell identity as an access stratum penalty cell within a penalty time includes: determining a quantity of times that the cell corresponding to the cell identity is set as the access stratum penalty cell; determining the penalty time based on an initial penalty time and the quantity of times that the cell corresponding to the cell identity is set as the access stratum penalty cell; and setting the cell corresponding to the cell identity as the access stratum penalty cell within the penalty time.

It may be learned from the foregoing that, in this embodiment of the present invention, the penalty time is determined based on the initial penalty time and the quantity of times that the cell corresponding to the cell identity is set as the access stratum penalty cell, so that the penalty time of the cell can be flexibly determined. When the quantity of times that the cell corresponding to the cell identity is set as the access stratum penalty cell is relatively large, the determined penalty time is longer, thereby further increasing the calling connection rate.

In a possible design, before the redialing, by the terminal, the method further includes: determining that the notification message does not carry indication information used to indicate playing a ringback tone.

It may be learned from the foregoing that, in this embodiment of the present invention, redialing is performed only when the notification message does not carry the indication information used to indicate playing the ringback tone, thereby improving user experience.

According to another aspect, an embodiment of the present invention provides a terminal. The terminal can implement functions performed by the terminal in the foregoing method examples. The functions may be implemented by using hardware, or may be implemented by hardware executing corresponding software. The hardware or software includes one or more modules corresponding to the foregoing functions.

In a possible design, a structure of the terminal includes a processor and a radio frequency circuit. The processor is configured to support the terminal in performing a corresponding function in the foregoing method. The radio frequency circuit is configured to receive/send a message, for example, receive a notification message that indicates an abnormal core network disconnection and that is sent by the core network. The terminal may further include a memory. The memory is configured to couple to the processor, and store a necessary program instruction and data of the terminal.

According to yet another aspect, an embodiment of the present invention provides a computer storage medium, configured to store a computer software instruction used by the foregoing terminal, where the computer software instruction includes a program designed for performing the foregoing aspects.

Compared with the prior art, in the solution provided in the present invention, when receiving the notification message indicating the abnormal core network disconnection, the terminal first obtains the cause value of the abnormal core network disconnection from the notification message, and then redials when determining that the cause value exists in the preconfigured first cause value list, so that the calling connection rate can be increased by redialing for a cause of the abnormal core network disconnection.

DETAILED DESCRIPTION OF ILLUSTRATIVE EMBODIMENTS

To make the purpose, technical solutions, and advantages of the embodiments of the present invention clearer, the following describes the technical solutions of the embodiments of the present invention with reference to the accompanying drawings in the embodiments of the present invention.

Currently, after a terminal initiates a call to another terminal, a large quantity of calling failures are caused by call connect disconnect (call connect disconnect) of a core network. For example, Table 1 shows detailed percentages (quantities of failures for various cause values/a total quantity of failures 77493) of various causes of the calling failures ranking the top 14 (38.22% in total).

TABLE 1

| Calling failure cause | Calling failure cause value | Quantity of calling failures | Percentage |
| --- | --- | --- | --- |
| Initialization on timer expiry, and recovery on time expiry | 102 | 4259 | 5.50% |
| Destination out of order | 27 | 3870 | 4.99% |
| Temporary error | 41 | 3432 | 4.43% |
| No link/channel available | 34 | 3156 | 4.07% |
| MO FAIL: Requested link/channel not available | 44 | 2819 | 3.64% |
| The cause indicates network out of work | 38 | 2567 | 3.31% |
| The cause indicates that a terminal point requested by a calling user cannot be reached | 1 | 1561 | 2.01% |
| Interworking, unspecified | 127 | 1404 | 1.81% |
| Invalid number format (an incomplete number) | 28 | 1403 | 1.81% |
| Service or option not available unspecified | 63 | 1136 | 1.47% |
| Unknown error of a protocol | 111 | 955 | 1.23% |
| Resource unavailable, unspecified | 47 | 916 | 1.18% |
| No route to destination | 3 | 865 | 1.12% |
| Preemption | 8 | 793 | 1.02% |

It may be learned from Table 1 that the calling failures are mainly caused by anomalies of the network and the peer mobile phone. In this embodiment of the present invention, a method for processing an abnormal core network disconnection is provided for causes of the calling failures.

Figure 1:
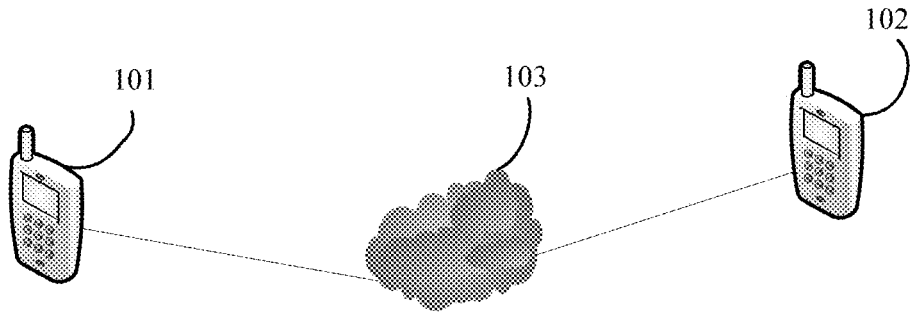
FIG. 1 is a schematic diagram of a network architecture according to an embodiment of the present invention.

FIG. 1 is a schematic diagram of a network architecture according to an embodiment of the present invention. Referring to FIG. 1, usually, when a terminal 101 communicates with another terminal 102, one of the terminals first needs to initiate a call to the other terminal. For example, the terminal 101 is used as a calling terminal. When the terminal 101 initiates a call to the terminal 102, the terminal 101 first needs to establish a communications connection to a core network 103, and then establishes a communications connection to the terminal 102 by using the core network 103. Because of causes such as that a network status is poor and the called terminal is abnormal, after the terminal 101 establishes the communications connection to the core network 103 and before the terminal 101 establishes the communications connection to the terminal 102, a situation in which the communications connection established between the terminal 101 and the core network 103 is abnormally disconnected by the core network 103 may occur.

In this embodiment of the present invention, optimization is performed for this situation. When receiving a notification message indicating the abnormal core network disconnection, the terminal does not directly report the notification message to a UI, and a first call failure is not determined. Instead, the terminal first obtains a cause value of the abnormal core network disconnection from the notification message, then inquires whether the cause value exists in a preconfigured first cause value list, and automatically redials when determining that the cause value exists in the preconfigured first cause value list, so that a calling connection rate can be increased.

The foregoing redialing may be redialing only once, or may be redialing for a plurality of times.

In an example, a process of the foregoing redialing may be specifically: redialing once every redial interval within preset total redial duration. A calling failure probability becomes increasingly low by redialing for a plurality of times, so that the calling connection rate can be increased.

The terminal mentioned in this embodiment of the present invention may include but is not limited to the mobile phone.

Effects of this embodiment of the present invention are described below based on analysis results of big data. Table 2 is a list of cause values that are of abnormal disconnections of a mobile phone call core network and that rank top eight. Statistics on ratios of cells with N calling failures caused by various cause values are collected in this table.

TABLE 2

| | Ratios of cells with N calling failures | | | |
|---|---|---|---|---|
| | N failures | | | |
| Cause value | 1 | 2 | 3 | >=4 |
| 44 | 77.32% | 10.82% | 6.70% | 5.15% |
| 17 | 94.34% | 3.77% | 1.89% | 0.00% |
| 102 | 91.56% | 6.49% | 0.65% | 1.30% |
| 27 | 84.21% | 9.77% | 3.01% | 3.01% |
| 57 | 37.50% | 25.00% | 12.50% | 25.00% |
| 34 | 71.13% | 13.38% | 7.04% | 8.45% |
| 41 | 81.21% | 11.70% | 1.42% | 5.67% |
| 38 | 90.12% | 5.81% | 1.74% | 2.33% |

Referring to Table 2, a statistical method used in Table 2 is described below by using a cause value 44 as an example, where a ratio of cells with N failures=a quantity of cells with N failures due to the cause value 44/a total quantity of cells with call failures due to the cause value 44.

It may be learned from Table 2 that, by using the cause value 44 as an example, a ratio of cells with one failure is 77.32%, a ratio of cells with two failures is 10.82%, a ratio of cells with three failures is 6.70%, and a ratio of cells with four failures is 50.15%. By analyzing statistical data in Table 2, it may be learned that, assuming that the ratio of cells with N failures may represent a probability that establishment of a call fails for N times in some cells of users, as a quantity of times of call establishment increases, a failure probability is increasingly low. Therefore, for an abnormal core network disconnection that is caused by some causes, the calling connection rate can be increased through redialing.

In addition, if a user fails to make a call for a plurality of times in a row in a cell, we may consider that the cell is abnormal, and the calling connection rate cannot be increased through only redialing. Therefore, the cell may be penalized, and a mobile phone is enabled to select another cell.

Figure 2:
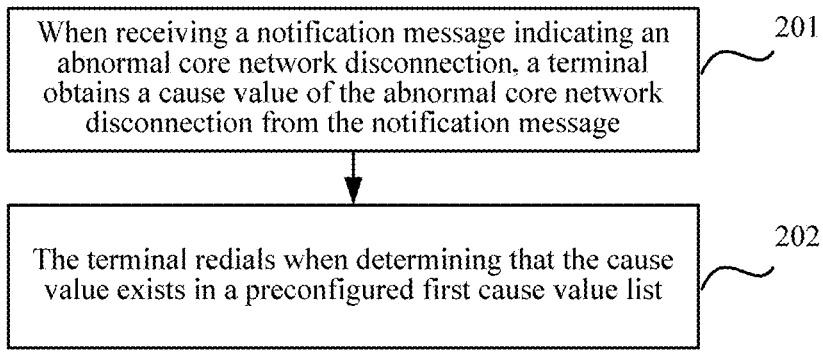
FIG. 2 is a flowchart of a method for processing an abnormal core network disconnection according to an embodiment of the present invention.

FIG. 2 is a flowchart of a method for processing an abnormal core network disconnection according to an embodiment of the present invention. The method includes:

Step 201: When receiving a notification message indicating an abnormal core network disconnection, a terminal obtains a cause value of the abnormal core network disconnection from the notification message.

Step 202: The terminal redials when determining that the cause value exists in a preconfigured first cause value list.

A cause value for which redialing needs to be performed is configurable. Based on a statistical ratio of big data and analysis on cause values, some cause values for which redialing is necessarily invalid are excluded, for example, a phone number is incorrect. Cause values for which redialing needs to be performed may include #31, #102, #41, #34, #44, #38, #127, #63, #111, #47, #3, and #8. #31 represents a default value. For causes that are of abnormal core network disconnections and that are represented by other cause values, refer to the foregoing Table 1 and Table 2.

Redialing may be automatically performed once every redial interval within preset total redial duration.

In this embodiment of the present invention, the total redial duration and the redial interval may be preset by considering a time at which a network becomes good and a user perception. For example, the total redial duration is set to 30 s, and the redial interval is set to 8 s.

Figure 3:
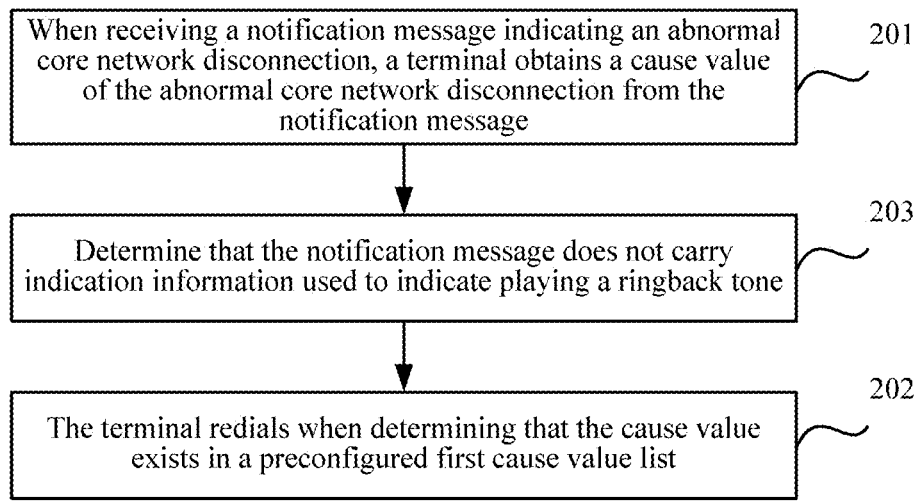
FIG. 3 is a flowchart of another method for processing an abnormal core network disconnection according to an embodiment of the present invention.

Optionally, as shown in FIG. 3, before step 202 is performed, the method may further include:

Step 203: Determine that the notification message does not carry indication information used to indicate playing a ringback tone.

By performing step 203, a problem of poor user experience that is caused by redialing after hearing the ringback tone by a user can be effectively avoided.

This embodiment of the present invention provides the method for processing an abnormal core network disconnection. When receiving the notification message indicating an abnormal core network disconnection, the terminal first obtains the cause value of the abnormal core network disconnection from the notification message, then determines that the cause value exists in the preconfigured first cause value list, and redials, so that a calling connection rate can be increased by redialing for a cause of the abnormal core network disconnection.

Although the calling connection rate can be increased to some extent by redialing, when a cell is abnormal, calling cannot succeed by only redialing. In this embodiment of the present invention, to further increase the calling connection rate, when an abnormal disconnect occurs, for a cause value that is of a disconnection and that satisfies a condition, a serving cell is replaced to continue a service, thereby increasing the calling connection rate.

To minimize a risk, measures performed on a cell with an abnormal disconnection may be gradually strengthened at two stages.

At a first stage, a cell is passively reselected after two consecutive failures. Specifically, a particular message may be sent to an access stratum (Access Stratum, AS) by using a non-access stratum (Non Access Stratum, NAS), and the access stratum searches another cell after receiving the message.

The NAS stratum supports signaling interworking between a mobile phone and a core network. The AS stratum supports signaling interworking between the mobile phone and a radio access network.

In this embodiment of the present invention, a threshold quantity of reselections may be preconfigured. The foregoing threshold quantity of reselections being 2 is only an example for description, and the threshold quantity of reselections may be set to another value, for example, 3 or 4, as required.

At a second stage, a cell with three consecutive failures is added to an access stratum penalty cell list, and the cell cannot be used as the serving cell within a penalty time. A stratum penalty is used.

In this embodiment of the present invention, a threshold quantity of times that the cell is added to the penalty cell list may be preconfigured. The foregoing threshold quantity of times being 3 is only an example for description, and the threshold quantity of times that the cell is added to the penalty cell list may be set to another value, for example, 4 or 5, as required. However, usually, the threshold quantity of times that the cell is added to the penalty cell list should be set to be greater than the threshold quantity of reselections.

As a quantity of abnormal core network disconnections increases, penalty strength on the cell gradually increases. At the first stage, the cell is not penalized, and the cell can also be camped on if a camping condition is satisfied at a next moment. At the second stage, the cell is penalized, and the cell can be camped on only when the camping condition is satisfied and the penalty time expires.

Figure 4:
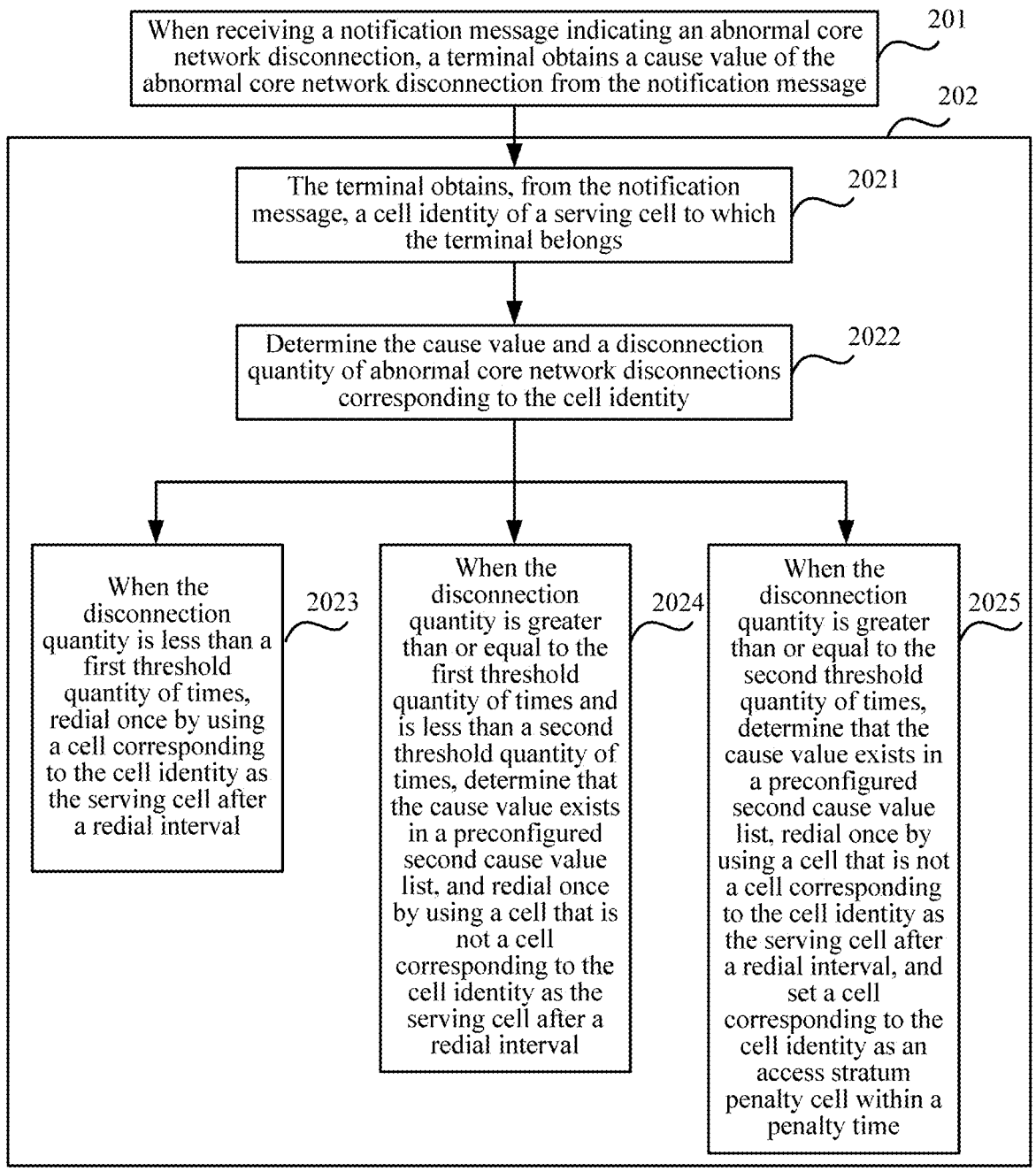
FIG. 4 is a flowchart of another method for processing an abnormal core network disconnection according to an embodiment of the present invention.

FIG. 4 is a flowchart of another method for processing an abnormal core network disconnection according to an embodiment of the present invention. Step 202 in the method specifically includes the following steps.

Step 2021: The terminal obtains, from the notification message, a cell identity of a serving cell to which the terminal belongs.

Step 2022: Determine the cause value and a disconnection quantity of abnormal core network disconnections corresponding to the cell identity.

Step 2023: When the disconnection quantity is less than a first threshold quantity of times, redial by using a cell corresponding to the cell identity as the serving cell.

The first threshold quantity of times is the foregoing threshold quantity of reselections.

Step 2024: When the disconnection quantity is greater than or equal to the first threshold quantity of times and is less than a second threshold quantity of times, determine that the cause value exists in a preconfigured second cause value list, and redial by using a cell that is not a cell corresponding to the cell identity as the serving cell.

The second threshold quantity of times is the threshold quantity of times that the cell is added to the penalty cell list, and the second threshold quantity of times is greater than the first threshold quantity of times. A cause value included in the second cause value list may be configured as required. The second cause value list may be usually configured as a subset of the first cause value list.

Step 2025: When the disconnection quantity is greater than or equal to the second threshold quantity of times, determine that the cause value exists in a preconfigured second cause value list, redial by using a cell that is not a cell corresponding to the cell identity as the serving cell, and set a cell corresponding to the cell identity as an access stratum penalty cell within a penalty time.

In this embodiment of the present invention, the steps may be combined as required. Details are not described herein.

In this embodiment of the present invention, an initial penalty time may be preconfigured. When the disconnection quantity is greater than or equal to the second threshold quantity of times, and it is determined that the cause value exists in the preconfigured second cause value list, the quantity of times that the cell is set as the access stratum penalty cell is first determined; then the penalty time is determined based on the initial penalty time and the quantity of times that the cell is set as the access stratum penalty cell; and the cell corresponding to the cell identity is set as the access stratum penalty cell within the penalty time.

An accumulated value may be preset. The quantity of times that the cell is set as the access stratum penalty cell is multiplied by the accumulated value and then is added to the initial penalty time, to obtain a sum, thereby determining the penalty time.

In other words, a larger quantity of times that the cell is set as the access stratum penalty cell indicates a longer penalty time.

In an example, the following penalty rule may be set: First penalty duration T is 30 s by default, and when this type of DISCONNECT cause occurs once, the penalty time is increased by T, and a longest penalty time is Tmax s, where Tmax is 300 s by default, and T and Tmax are configurable.

In addition, in this embodiment of the present invention, in addition to that the cause value list, the threshold quantity of reselections, the threshold quantity of times that the cell is added to the penalty cell list, the initial penalty duration, and the accumulated value may be preconfigured, an initial value of each variable on which statistics needs to be collected and longest penalty duration may further be preconfigured.

In an example, a network on which a mobile phone is currently camped is a Global System for Mobile Communication (Global System for Mobile Communication, GSM) network, and networks on which the mobile phone camped are a Long Term Evolution (Long Term Evolution, LTE) network and a Wideband Code Division Multiple Access (Wideband Code Division Multiple Access, WCDMA) network. Compared with the GSM network, the LTE network and the WCDMA network are inter-systems, and the quantity of abnormal core network disconnections is not cleared during inter-system handover.

In an example, the NAS stratum is mainly responsible for sending, to the AS stratum during each abnormal disconnection of a calling core network (including that a communications connection of the core network is released), a location area identity (Location Area Identification, LAI)+ the cell identity (CELLID), whether an alert (alert) exists, whether a connection is established, and a cause value of the disconnection.

In this embodiment of the present invention, during specific implementation, the terminal needs to collect statistics on a correspondence among the cell identity, the cause value, and the disconnection quantity when the abnormal core network disconnection occurs. To reduce resources processed by the terminal, statistics may be collected on only a preset quantity of cause values. For each cause value, statistics are correspondingly collected on only a preset quantity of cells. For example, a largest quantity of cause values on which statistics are collected is 16, and for each cause value, a largest quantity of cells on which statistics are correspondingly collected is 16. If the quantity of cells exceeds 16, the cells are covered based on a rule of first in first out.

Based on a principle that only a wireless network side is penalized and several top cause values resulting in the abnormal core network disconnection, the following nine cause values are configured in the second cause value list after initial filtering is performed.

A category of no available resource:
Cause No. 34: No circuit/channel available
Cause No. 38: Network out of order Cause No. 41: Temporary failure
Cause No. 42: Switching equipment congestion
Cause No. 44: Requested circuit/channel not available
Cause No. 47: Resource unavailable, unspecified
A category of no applicable service or optional item:
Cause No. 57: Bearer capacity not authorized
Cause No. 58: Bearer capacity not presently available
Cause No. 63: Service or option not available, unspecified In this embodiment of the present invention, the penalty rule may be preset. After the penalty cell is set, when the penalty rule is satisfied, a corresponding cell is set as a cell on which the terminal may be camped on. The penalty rule may specifically include: a. The mobile phone is restarted; or, b. A peer terminal is connected; or, c. An alert (alert) exists and a disconnection cause (cause) is a general event, that is, a disconnection cause value is 0 to 31.

Figure 5:
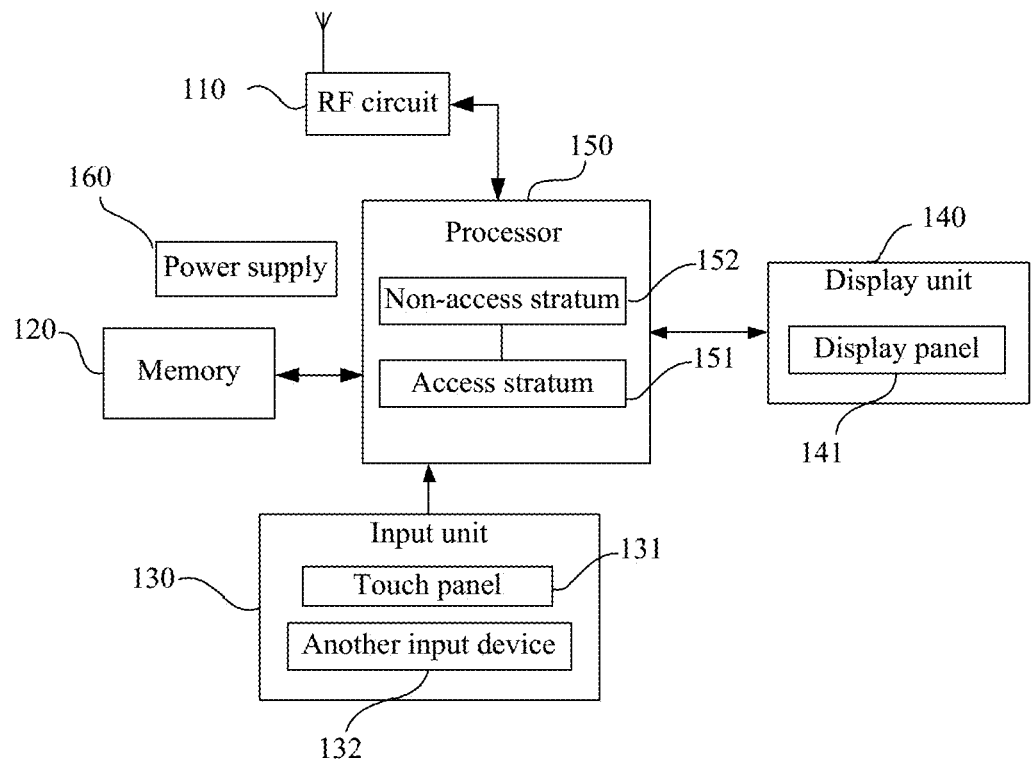
FIG. 5 is a schematic structural diagram of a terminal according to an embodiment of the present invention.

Referring to FIG. 5, a terminal provided in an embodiment of the present invention includes components such as a radio frequency (Radio Frequency, RF) circuit no, a memory 120, an input unit 130, a display unit 140, a processor iso, and a power supply 160. A person skilled in the art may understand that the structure of the terminal shown in FIG. 5 does not constitute a limitation to the terminal, and the terminal may include more components or fewer components than those shown in the figure, or some components may be combined, or a different component deployment may be used.

The following makes specific introduction of components of the terminal with reference to FIG. 5.

The RF circuit no may be configured to receive/send information, for example, perform information exchange with a core network device or an access network device, and send received information to the processor 150 for processing. Usually, the RF circuit no includes, but is not limited to, an antenna, at least one amplifier, a transceiver, a coupler, a low noise amplifier (Low Noise Amplifier, LNA), a duplexer, and the like. In addition, the RF circuit 110 may also communicate with another device by using a wireless communications network. Wireless communication may use any communication standard or protocol, which includes, but is not limited to, Global System for Mobile communications (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, Short Messaging Service (Short Messaging Service, SMS), and the like.

The memory 120 may be configured to store a software program and a module, and the processor 150 runs the software program and the module stored in the memory 120, to enable the terminal to perform the method for processing an abnormal core network disconnection. The memory 120 may mainly include a program storage area and a data storage area. The program storage area may store an operating system, an application required by performing the foregoing processing method, and the like. The data storage area may store preconfigured parameters, such as total redial duration and a redial interval, and a statistical correspondence among a cause value, a cell identity, and a disconnection quantity of abnormal core network disconnections, and the like. In addition, the memory 120 may be a volatile memory (volatile memory), for example, a random-access memory (random-access memory, RAM for short); the memory 120 may alternatively be a non-volatile memory (non-volatile memory), for example, a read-only memory (read-only memory, ROM for short), a flash memory (flash memory), a hard disk drive (hard disk drive, HDD for short), or a solid-state drive (solid-state drive, SSD for short); or the memory 120 may include a combination of the foregoing memories.

The input unit 130 may be configured to receive digital or character information input by a user. Specifically, the input unit 130 may include a touch panel 131 and another input device 132. The touch panel 131, also referred to as a touchscreen, may collect a touch operation of the user on or near the touch panel 131 (such as an operation of the user on the touch panel 131 or near the touch panel 131 by using any suitable object or accessory such as a finger or a stylus), and drive a corresponding connection apparatus based on a preset program. Optionally, the touch panel 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 150. Moreover, the touch controller can receive and execute a command sent from the processor 150. In addition, the input unit 130 may implement the touch panel 131 by using a resistive, capacitive, infrared, or surface sound wave type touch panel. In addition to the touch panel 131, the input unit 130 may further include the another input device 132. Specifically, the another input device 132 may include, but is not limited to: one or more of a physical keyboard, a functional key (such as a volume control key or a switch key), a trackball, a mouse, and a joystick.

The display unit 140 may be configured to display information input by the user or information provided to the user, and the like. The display unit 140 may include a display panel 141. Optionally, the display panel 141 may be configured by using a liquid crystal display (Liquid Crystal Display, LCD), an organic light-emitting diode (Organic Light-Emitting Diode, OLED), or the like. Further, the touch panel 131 may cover the display panel 141. After detecting a touch operation on or near the touch panel 131, the touch panel 131 transfers the touch operation to the processor 150, to determine a type of a touch event. The processor 150 then provides a corresponding visual output on the display panel 141 based on the type of the touch event. Although, in FIG. 5, the touch panel 131 and the display panel 141 are used as two separate parts to implement input and output functions of the terminal, in some embodiments, the touch panel 131 and the display panel 141 may be integrated to implement the input and output functions of the terminal.

The processor 150 is a control center of the terminal, connects each part of the whole terminal by using various interfaces and lines, and performs the method for processing an abnormal core network disconnection by operating or executing the software program and/or module stored in the memory 120 and invoking data stored in the memory 120. Optionally, the processor 150 may include one or more processing units. Preferably, the processor 150 may integrate an application processor and a modem processor. The application processor mainly processes an operating system, a user interface, an application program, and the like. The modem processor mainly processes wireless communication. It may be understood that the foregoing modem processor may alternatively not be integrated into the processor 150.

The processor 150 includes functions of two parts of an access stratum 151 and a non-access stratum 152. During specific implementation, the access stratum 151 cooperates with the non-access stratum 152 to jointly implement the method for processing an abnormal core network disconnection.

The terminal further includes the power supply 160 (such as a battery) for supplying power to the components. Preferably, the power supply may be logically connected to the processor 150 by using a power management system, thereby implementing functions such as charging, discharging and power consumption management by using the power management system.

The processor 150 is configured to: when receiving, by using the radio frequency circuit 110, a notification message indicating an abnormal core network disconnection, obtain a cause value of the abnormal core network disconnection from the notification message; and redial when determining that the cause value exists in a preconfigured first cause value list.

In an example, the operation that the processor 150 redials when determining that the cause value exists in the preconfigured first cause value list includes: when determining that the cause value exists in the preconfigured first cause value list, redialing once every redial interval within preset total redial duration.

In an example, the operation that the processor 150 redials includes: obtaining, by the terminal from the notification message, a cell identity of a serving cell to which the terminal belongs; determining the cause value and a disconnection quantity of abnormal core network disconnections corresponding to the cell identity; and when the disconnection quantity is less than a first threshold quantity of times, redialing by using a cell corresponding to the cell identity as the serving cell; or when the disconnection quantity is greater than or equal to the first threshold quantity of times and is less than a second threshold quantity of times, determining that the cause value exists in a preconfigured second cause value list, and redialing by using a cell that is not a cell corresponding to the cell identity as the serving cell; or when the disconnection quantity is greater than or equal to the second threshold quantity of times, determining that the cause value exists in a preconfigured second cause value list, redialing once by using a cell that is not a cell corresponding to the cell identity as the serving cell after a redial interval, and setting a cell corresponding to the cell identity as an access stratum penalty cell within a penalty time.

In an example, the operation that the processor 150 sets the cell corresponding to the cell identity as the access stratum penalty cell within the penalty time includes: determining a quantity of times that the cell corresponding to the cell identity is set as the access stratum penalty cell; determining the penalty time based on an initial penalty time and the quantity of times that the cell corresponding to the cell identity is set as the access stratum penalty cell; and setting the cell corresponding to the cell identity as the access stratum penalty cell within the penalty time.

In an example, before the operation that processor 150 redials, the processor 150 is further configured to: determine that the notification message does not carry indication information used to indicate playing a ringback tone.

Although not shown, the terminal may further include a camera, a Bluetooth module, a sensor, an audio frequency circuit, a USB module, and the like. Details are not described herein.

Figure 6:
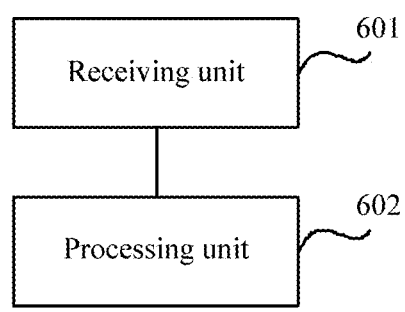
FIG. 6 is another schematic structural diagram of a terminal according to an embodiment of the present invention.

FIG. 6 is another schematic structural diagram of a terminal according to an embodiment of the present invention. The terminal is configured to perform the method for processing an abnormal core network disconnection provided in embodiments of the present invention. The terminal includes the following units.

A receiving unit 601 is configured to receive a notification message indicating an abnormal core network disconnection.

The receiving unit 601 may be specifically the radio frequency circuit no shown in FIG. 5.

A processing unit 602 is configured to: when the receiving unit 601 receives the notification message indicating the abnormal core network disconnection, obtain a cause value of the abnormal core network disconnection from the notification message; and redial when determining that the cause value exists in a preconfigured first cause value list.

The processing unit 602 may be specifically the processor 150 shown in FIG. 5.

In an example, the processing unit 602 is specifically configured to: when determining that the cause value exists in the preconfigured first cause value list, redial once every redial interval within preset total redial duration.

In an example, the processing unit 602 is specifically configured to: obtain, from the notification message, a cell identity of a serving cell to which the terminal belongs; determine the cause value and a disconnection quantity of abnormal core network disconnections corresponding to the cell identity; and when the disconnection quantity is less than a first threshold quantity of times, redial by using a cell corresponding to the cell identity as the serving cell; or when the disconnection quantity is greater than or equal to the first threshold quantity of times and is less than a second threshold quantity of times, determine that the cause value exists in a preconfigured second cause value list, and redial by using a cell that is not a cell corresponding to the cell identity as the serving cell; or when the disconnection quantity is greater than or equal to the second threshold quantity of times, determine that the cause value exists in a preconfigured second cause value list, redial by using a cell that is not a cell corresponding to the cell identity as the serving cell, and set a cell corresponding to the cell identity as an access stratum penalty cell within a penalty time.

In an example, the processing unit 602 is specifically configured to: determine a quantity of times that the cell corresponding to the cell identity is set as the access stratum penalty cell; determine the penalty time based on an initial penalty time and the quantity of times that the cell corresponding to the cell identity is set as the access stratum penalty cell; and set the cell corresponding to the cell identity as the access stratum penalty cell within the penalty time.

In an example, the processing unit 602 is further configured to: before redialing, determine that the notification message does not carry indication information used to indicate playing a ringback tone.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory (non-transitory) medium, such as a random-access memory, read-only memory, a flash memory, a hard disk, a solid state drive, a magnetic tape (magnetic tape), a floppy disk (floppy disk), an optical disc (optical disc), or any combination thereof.

The foregoing descriptions are merely examples of embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    attempting, by a first terminal, to connect to a second terminal;
    obtaining, by the first terminal, in response to a notification message indicating an abnormal core network disconnection being received, a cause value of the abnormal core network disconnection from the notification message;
    obtaining, by the first terminal from the notification message, a cell identity of a serving cell to which the first terminal belongs;
    determining, by the first terminal, whether the cause value exists in a preconfigured first cause value list;
    determining a quantity of times that the cell corresponding to the cell identity is set as an access stratum penalty cell;
    determining a penalty time based on an initial penalty time and the quantity of times that the cell corresponding to the cell identity is set as an access stratum penalty cell;
    setting the cell corresponding to the cell identity as an access stratum penalty cell within the penalty time; and
    reattempting, by the first terminal, in response to the cause value existing in the preconfigured first cause value list, to connect to the second terminal.

2. The method according to claim 1, wherein reattempting, by the first terminal, to connect to the second terminal comprises:
    reattempting, by the first terminal, to connect to the second terminal one time every reattempt interval within a preset total reattempt duration.

3. The method according to claim 1, wherein reattempting, by the first terminal, to connect to the second terminal comprises:
    determining the cause value and a disconnection quantity of abnormal core network disconnections corresponding to the cell identity; and
    when the disconnection quantity is less than a first threshold quantity of times, reattempting to connect to the second terminal using a cell corresponding to the cell identity as the serving cell.

4. The method according to claim 1, wherein reattempting, by the first terminal, to connect to the second terminal comprises:
    determining the cause value and a disconnection quantity of abnormal core network disconnections corresponding to the cell identity; and
    determining, in response to the disconnection quantity being greater than or equal to a first threshold quantity of times and less than a second threshold quantity of times, that the cause value exists in a preconfigured second cause value list, and reattempting to connect to the second terminal using a cell that does not correspond to the cell identity as the serving cell.

5. The method according to claim 1, wherein reattempting, by the first terminal, to connect to the second terminal comprises:
    determining the cause value and a disconnection quantity of abnormal core network disconnections corresponding to the cell identity; and
    determining, in response to the disconnection quantity being greater than or equal to a second threshold quantity of times, that the cause value exists in a preconfigured second cause value list, reattempting to connect to the second terminal using a cell that does not correspond to the cell identity as the serving cell.

6. The method according to claim 1, wherein before reattempting, by the first terminal, to connect to the second terminal, the method further comprises:
    determining that the notification message does not carry any indication information indicating playing a ringback tone.

7. A first terminal, comprising:
    a radio frequency circuit; and
    a processor;
    wherein the processor is configured to:
        attempt to connect to a second terminal;
        obtain, in response to receiving, using the radio frequency circuit, a notification message indicating an abnormal core network disconnection, a cause value of the abnormal core network disconnection from the notification message;
        obtain, from the notification message, a cell identity of a serving cell to which the first terminal belongs;
        determine whether the cause value exists in a preconfigured first cause value list;
        determine a quantity of times that the cell corresponding to the cell identity is set as an access stratum penalty cell;
        determine a penalty time based on an initial penalty time and the quantity of times that the cell corresponding to the cell identity is set as an access stratum penalty cell;
        set the cell corresponding to the cell identity as an access stratum penalty cell within the penalty time; and
        reattempt to connect to the second terminal, in response to determining that the cause value exists in the preconfigured first cause value list.

8. The first terminal according to claim 7, wherein the processor being configured to reattempt to connect to the second terminal, comprises the processor being configured to:
    reattempt to connect to the second terminal one time every reattempt interval within a preset total reattempt duration.

9. The first terminal according to claim 7, wherein the processor being configured to reattempt to connect to the second terminal comprises the processor being configured to:

determine the cause value and a disconnection quantity of abnormal core network disconnections corresponding to the cell identity; and when the disconnection quantity is less than a first threshold quantity of times, reattempt to connect to the second terminal using a cell corresponding to the cell identity as the serving cell.

10. The first terminal according to claim 7, wherein the processor being configured to reattempt to connect to the second terminal comprises the processor being configured to:

determine the cause value and a disconnection quantity of abnormal core network disconnections corresponding to the cell identity; and determine, in response to the disconnection quantity being greater than or equal to a first threshold quantity of times and less than a second threshold quantity of times, that the cause value exists in a preconfigured second cause value list, and reattempt to connect to the second terminal using a cell that does not correspond to the cell identity as the serving cell.

11. The first terminal according to claim 7, wherein the processor being configured to reattempt to connect to the second terminal comprises the processor being configured to:

determine the cause value and a disconnection quantity of abnormal core network disconnections corresponding to the cell identity; and determine, in response to the disconnection quantity being greater than or equal to a second threshold quantity of times, that the cause value exists in a preconfigured second cause value list, reattempt to connect to the second terminal one time using a cell that does correspond to the cell identity as the serving cell after a reattempt interval.

12. The first terminal according to claim 7, wherein the processor is further configured to:

before reattempting to connect to the second terminal, determine that the notification message does not carry any indication information indicating playing a ringback tone.

13. A non-transitory computer-readable media storing computer instructions that, when executed by one or more processors, cause the one or more processors to:

attempt to connect to a terminal;

obtain, in response to receiving a notification message indicating an abnormal core network disconnection, a cause value of the abnormal core network disconnection from the notification message;

obtain, from the notification message, a cell identity of a serving cell to which a first terminal belongs;

determine whether the cause value exists in a preconfigured first cause value list;

determine a quantity of times that the cell corresponding to the cell identity is set as an access stratum penalty cell;

determine a penalty time based on an initial penalty time and the quantity of times that the cell corresponding to the cell identity is set as an access stratum penalty cell;

set the cell corresponding to the cell identity as an access stratum penalty cell within the penalty time; and reattempt, in response to determining that the cause value exists in a preconfigured first cause value list, to connect to the terminal.

14. The media according to claim 13, wherein the instructions that, when executed by the one or more processors, cause the one or more processors to reattempt to connect to terminal, include instructions that, when executed by the one or more processors, cause the one or more processors to:

reattempt to connect to the terminal one time every reattempt interval within a preset total reattempt duration.

15. The media according to claim 13, wherein the instructions that, when executed by the one or more processors, cause the one or more processors to reattempt to connect to the terminal include instructions that, when executed by the one or more processors, cause the one or more processors to:

determine the cause value and a disconnection quantity of abnormal core network disconnections corresponding to the cell identity; and re-attempt to connect to the terminal by:

reattempt, in response to the disconnection quantity being less than a first threshold quantity of times, to connect to the terminal using a cell corresponding to the cell identity as the serving cell; or determine, in response to the disconnection quantity being greater than or equal to the first threshold quantity of times and less than a second threshold quantity of times, that the cause value exists in a preconfigured second cause value list, and reattempt to connect to the terminal using a cell that does not correspond to the cell identity as the serving cell; or determine, in response to the disconnection quantity being greater than or equal to the second threshold quantity of times, that the cause value exists in the preconfigured second cause value list, reattempt to connect to the terminal on time using the cell that does not correspond to the cell identity as the serving cell after a reattempt interval.

16. The media according to claim 13, wherein the computer instructions, when executed by the one or more processors, further cause the one or more processors to:

before reattempting to connect to the terminal, determine that the notification message does not carry any indication information used to indicate playing a ringback tone.

* * * * *